No. 737,119.

Patented August 25, 1903.

UNITED STATES PATENT OFFICE.

FREDERICK M. LIBBY, OF PORTLAND, MAINE.

FOOD COMPOUND.

SPECIFICATION forming part of Letters Patent No. 737,119, dated August 25, 1903.

Application filed March 14, 1903. Serial No. 147,753. (No specimens.)

*To all whom it may concern:*

Be it known that I, FREDERICK M. LIBBY, a citizen of the United States, and a resident of Portland, county of Cumberland, State of Maine, have invented an Improvement in Food Compounds, of which the following description is a specification.

The invention to be hereinafter described relates to food compounds formed of vegetables or fruits treated and combined to present a food product possessing preservative qualities, so that the compound may remain wholesome and ready for use as human food for an indefinite time, all as will hereinafter appear.

It is well known that limes (the fruit of the *Citrus limetta*) are an excellent remedial agent in the treatment of certain diseases—such, for instance, as rheumatism—but their use as a food product at the present time is much restricted, owing to the fact that they have not heretofore been compounded with other vegetables and substances in a palatable form as food. In my experiments with limes to determine some form in which they might be presented and used more generally as human food I have discovered that when properly associated with certain vegetables and heated to within a few degrees of the boiling-point the essence and essential oils of the limes are disseminated throughout the mass and impart thereto a rich and most palatable flavor, and that the mass thus treated when combined with vinegar presents a vegetable food in the form of what is generally denominated "pickle," possessing preservative qualities which maintain it in a wholesome and ready condition for use as food. In practice I have found the best results to be secured from the use of pickled limes rather than the limes in their raw state; but either form may be used.

In carrying out my invention I combine the ingredients in substantially the proportion or relative quantities as follows: two pounds of tomatoes, two onions, two pickled limes, one table-spoonful of sugar, one table-spoonful of salt, one cup of vinegar, one-fourth teaspoonful of red pepper. The limes, preferably in the pickled state, are first deprived of the seeds, and then the entire limes, except the removed seeds, are chopped into fine pieces. The onions and tomatoes are also cut into small pieces, the chopping of the several ingredients being effected separately and the other ingredients, which I will designate as "condiments" in substantially the proportions named, are then well mixed together, the whole being placed in a suitable receptacle and subjected to heat. It is desirable that the mass shall be heated to within a few degrees of the boiling-point and shall remain in this condition for about one hour without exceeding at any time 212° Fahrenheit. During this heating process the essential oils of the limes circulate throughout the entire mass of the compound, imparting thereto a most palatable and desirable flavor, and to further advance this desired end the limes and onions should be chopped quite fine, while the tomatoes may be divided into larger pieces. When the mass has been subjected to the heating operation sufficiently long—that is, about one hour—the compound is placed in jars, cans, or other receptacles and sealed for shipment or storage. Limes prepared in this manner and associated with onions, tomatoes, and other ingredients named present a food product resembling in some respects what are commonly known as pickles, in which the desirable flavor of the limes permeates the entire mass and wherein the lime itself can be palatably presented as a food. Prepared in this form the remedial or medicinal character of the lime in treatment of rheumatism is made readily available, and a wholesome food product is furnished which may be appropriately denominated "limetta pickle."

Having thus described my invention, what I claim as new, and desire to secure by Letters Patent, is—

The herein-described food product or compound comprising limes, onions, and tomatoes, said ingredients being divided into pieces, and sugar, salt, and vinegar, the ingredients being mixed in the proportions substantially as described.

In testimony whereof I have signed my name to this specification in the presence of two subscribing witnesses.

FREDERICK M. LIBBY.

Witnesses:
NEWEL W. EDSON,
WALTER E. SMART.